United States Patent
Cheng et al.

(10) Patent No.: US 11,099,667 B1
(45) Date of Patent: Aug. 24, 2021

(54) ROLLER MODULE FOR A MOUSE DEVICE HAVING A MOVABLE MAGNET

(71) Applicant: Primax Electronics Ltd., Taipei (TW)

(72) Inventors: Li-Kuei Cheng, Taipei (TW); Sheng-An Tsai, Taipei (TW); Yung-Ming Tsai, Taipei (TW); Shu-An Huang, Taipei (TW); Chun-Che Wu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/912,296

(22) Filed: Jun. 25, 2020

(30) Foreign Application Priority Data

Apr. 1, 2020 (TW) .................... 109111312

(51) Int. Cl.
*G06F 3/0362* (2013.01)
*G06F 3/0354* (2013.01)
*H01F 7/02* (2006.01)

(52) U.S. Cl.
CPC ........ *G06F 3/0362* (2013.01); *G06F 3/03543* (2013.01); *H01F 7/02* (2013.01)

(58) Field of Classification Search
CPC ............................ G06F 3/0362; G06F 3/03543
See application file for complete search history.

(56) References Cited

U.S. PATENT DOCUMENTS

| | | | | |
|---|---|---|---|---|
| 10,444,872 B2* | 10/2019 | Hsueh | ................ | G06F 3/0362 |
| 2006/0001657 A1* | 1/2006 | Monney | ............... | G06F 3/0312 345/184 |
| 2007/0146324 A1* | 6/2007 | Blandin | ............. | G06F 3/03543 345/163 |
| 2007/0146424 A1* | 6/2007 | Umeda | ............... | B41J 2/16535 347/38 |
| 2007/0188453 A1* | 8/2007 | O'Sullivan | ........... | G06F 3/0312 345/163 |
| 2010/0141583 A1* | 6/2010 | Wu | ....................... | G06F 3/0312 345/164 |
| 2010/0238113 A1* | 9/2010 | Wu | ....................... | G06F 3/0362 345/163 |
| 2011/0298713 A1* | 12/2011 | Wu | ....................... | G06F 3/03543 345/163 |
| 2018/0329525 A1* | 11/2018 | Chang | ................. | G06F 3/03543 |
| 2019/0073048 A1* | 3/2019 | Tsai | ..................... | G06F 3/03543 |
| 2019/0094991 A1* | 3/2019 | Tsai | ..................... | G06F 3/0362 |
| 2019/0094994 A1* | 3/2019 | Tsai | ..................... | G06F 3/0362 |

* cited by examiner

*Primary Examiner* — Chun-Nan Lin
(74) *Attorney, Agent, or Firm* — Kirton McConkie; Evan R. Witt

(57) ABSTRACT

A mouse device includes a casing and a roller module. The roller module is installed within the casing. The roller module includes a roller wheel, a movable magnet, a first magnet and a second magnet. In response to a repulsive force between the first magnet and the movable magnet, the roller module is in a tactile feel mode. In response to an attractive force between the second magnet and the movable magnet, the roller module is in a smooth scrolling mode.

16 Claims, 9 Drawing Sheets

ROLLER MODULE FOR A MOUSE DEVICE HAVING A MOVABLE MAGNET

FIELD OF THE INVENTION

The present invention relates to an input device, and more particularly to a mouse module.

BACKGROUND OF THE INVENTION

The common computer peripheral input devices include mouse devices, keyboard devices or trackballs. When a device mouse is held by the palm of a user, the user may move the mouse device to control the movement of a mouse cursor of the computer system. Moreover, by manipulating the buttons of the mouse device with the user's fingers, the user may click and select a desired icon shown on the computer monitor or execute a corresponding function.

Please refer to FIGS. 1 and 2. FIG. 1 is a schematic perspective view illustrating the appearance of a conventional mouse device. FIG. 2 is a schematic perspective view illustrating a portion of a roller module of the conventional mouse device. The conventional mouse device is disclosed in U.S. Pat. No. 7,733,328. As shown in FIGS. 1 and 2, the mouse device 100 comprises a casing 101, a roller module 105, a control button 110 and a sensor (not shown). When the movement of the casing 101 relative to a working surface is detected by the sensor, the sensor issues a corresponding signal to a computer system. According to the signal, the computer system controls a moving trajectory of a mouse cursor. When the control button 110 is pressed down, a specified control command is executed. For example, when the control command is executed, a copying function or a text selecting function is implemented.

The roller module 105 comprises a roller wheel 300, a pivotal arm 380 and a driving motor 385. When the roller 300 is rotated, another control command is executed to scroll a window of the computer, enlarge or shrink an icon, or adjust a sound volume. An inner side of the roller wheel 300 has a corrugated surface 370. As the pivotal arm 380 is driven by the driving motor 385 and the pivotal arm 380 is contacted with the corrugated surface 370, the rotation of the roller wheel 300 for one turn generates multi-stage tactile feels. Under this circumstance, the roller wheel 300 is in a tactile feel mode. Consequently, the quantitative control function in response to the control command can be achieved. For example, when each stage of tactile feel is generated in response to the rotation of the roller wheel 300, the icon can be shrunken 25% or enlarged 25%.

As the pivotal arm 380 is driven by the driving motor 385 and the pivotal arm 380 is separated from the corrugated surface 370, the roller wheel 300 is in a smooth scrolling mode. In the smooth scrolling mode, the roller wheel 300 is continuously rotated for an extended period when the roller wheel is rotationally pushed by the user. Consequently, the control command is executed to implement an additional function. For example, if the user intends to scroll through the window of the computer system from the topmost side to the bottommost side, the user may push the roller wheel 300 until the window of the computer system is scrolled to the desired position. That is, it is not necessary to continuously push the roller wheel 300 to rotate the roller wheel 300.

Moreover, the roller module 105 has so many components that are connected with the driving motor 385 and the pivotal arm 380. While the operation mode of the roller wheel 300 is switched from the tactile feel mode to the smooth scrolling mode or switched from the smooth scrolling mode to the tactile feel mode, many linked components are correspondingly moved. Since the structural relationships between these components are very complicated, it is difficult to fabricate these components. Moreover, the frequent use of the roller wheel 300 may damage the components. Moreover, as today's computer professional software (such as drawing software and image processing software) becomes more and more diversified, more and more functions can be provided. However, the operation becomes more complicated.

Moreover, the roller wheel 300 of the roller module 105 of the conventional mouse device 100 can be operated in a single tactile feel mode. The single tactile feel mode of the roller wheel 300 cannot meet the user's requirements.

In other words, the conventional mouse device and the conventional roller module need to be further improved.

SUMMARY OF THE INVENTION

An object of the present invention provides a roller module for a mouse device. According to the principle "Like poles of magnets repel while unlike poles of magnets attract", the roller module is selectively in smooth scrolling mode or a tactile feel mode.

Another object of the present invention provides a mouse device with the roller module.

In accordance with an aspect of the present invention, a roller module for a mouse device is provided. The roller module includes a roller wheel, a movable magnet, a first magnet and a second magnet. The roller wheel includes a wheel body, a rotation shaft and a ratchet. The rotation shaft is connected with the wheel body and synchronously rotated with the wheel body. The ratchet is installed on the rotation shaft. The ratchet has a toothed surface. When the first magnet is close to the movable magnet, a first repulsive force between the first magnet and the movable magnet is generated and the movable magnet is moved toward the toothed surface of the ratchet in response to the first repulsive force, so that the roller wheel is in a tactile feel mode. When the second magnet is close to the movable magnet, an attractive force between the second magnet and the movable magnet is generated and the movable magnet is moved toward the second magnet in response to the attractive force, so that the roller wheel is in a smooth scrolling mode.

In accordance with another aspect of the present invention, a mouse device is provided. The mouse device includes a roller wheel, a movable magnet, a first magnet, a second magnet and a casing. The roller wheel includes a wheel body, a rotation shaft and a ratchet. The rotation shaft is connected with the wheel body and synchronously rotated with the wheel body. The ratchet is installed on the rotation shaft. The ratchet has a toothed surface. When the first magnet is close to the movable magnet, a first repulsive force between the first magnet and the movable magnet is generated and the movable magnet is moved toward the toothed surface of the ratchet in response to the first repulsive force, so that the roller wheel is in a tactile feel mode. When the second magnet is close to the movable magnet, an attractive force between the second magnet and the movable magnet is generated and the movable magnet is moved toward the second magnet in response to the attractive force, so that the roller wheel is in a smooth scrolling mode. The roller wheel, the movable magnet, the first magnet and the second magnet are accommodated within the casing. Moreover, at least a portion of the wheel body is exposed outside the casing so as to be operated by a user.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
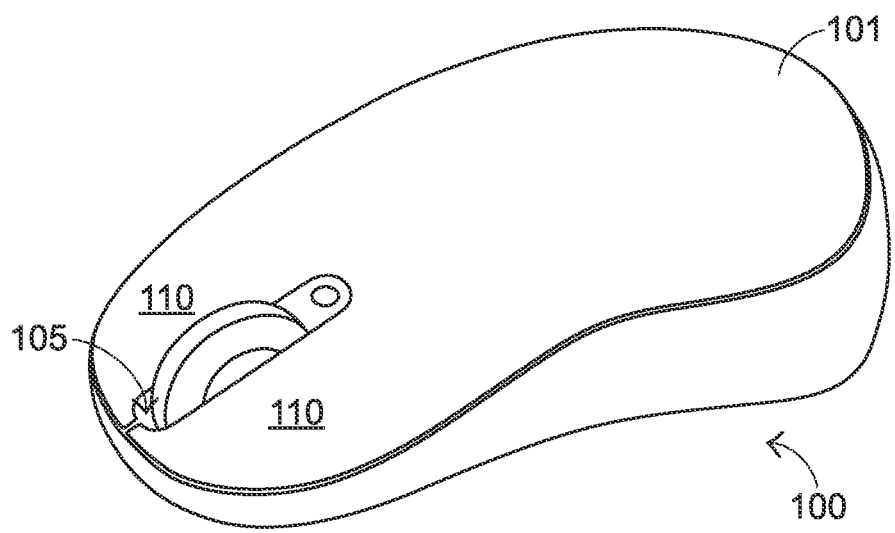
FIG. 1 is a schematic perspective view illustrating the appearance of a conventional mouse device.
Figure 2:
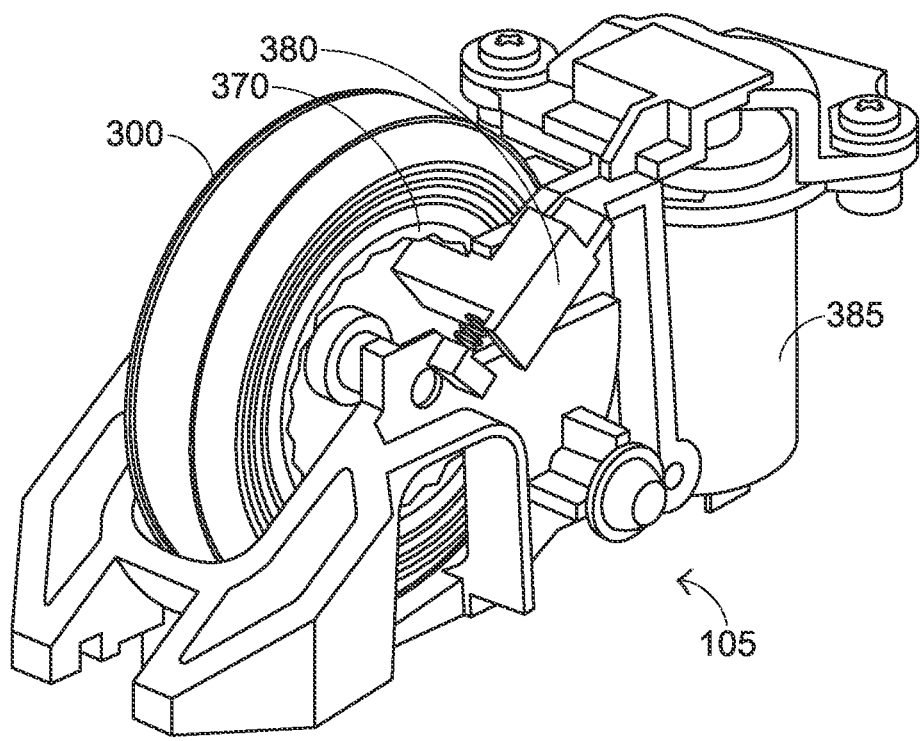
FIG. 2 is a schematic perspective view illustrating a portion of a roller module of the conventional mouse device.

The embodiments of present invention will be described more specifically with reference to the following drawings. Generally, in the drawings and specifications, identical or similar components are designated by identical numeral references. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 3:
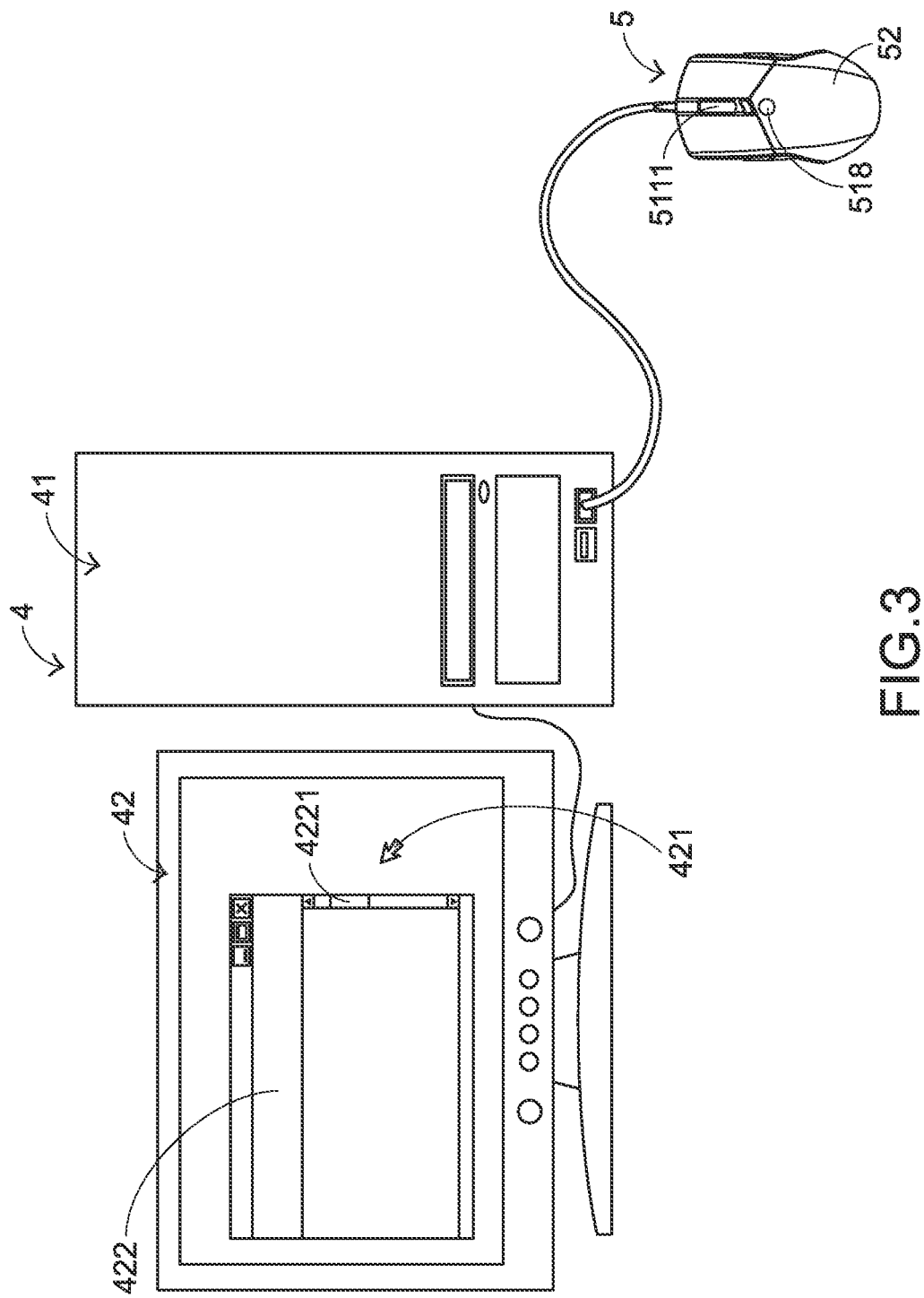
FIG. 3 schematically illustrates the connection between a computing device and a mouse device according to a first embodiment of the present invention.

FIG. 3 schematically illustrates the connection between a computing device and a mouse device according to a first embodiment of the present invention. As shown in FIG. 3, the computing device 4 comprises a computer host 41 and a computer screen 42. The computer host 41 is in communication with the mouse device 5 and the computer screen 42. In this embodiment, the computer host 41 is in communication with the mouse device 5 and the computer screen 42 in a wired transmission manner. Alternatively, the computer host is in communication with the mouse device and the computer screen in a wireless transmission manner. A cursor 421 and a graphic-based window 422 are shown on the computer screen 42. When the user operates the mouse device 5 and/or holds the mouse device 5 to move the mouse device 5, the cursor 421 or a scroll bar 4221 of the graphic-based window 422 shown on the computer screen 42 is correspondingly moved. Consequently, the computing device 4 is correspondingly controlled. The implementation examples and principles of operating the mouse device 5 to control the computing device 4 are well known to those skilled in the art, and not redundantly described herein.

Figure 4A:
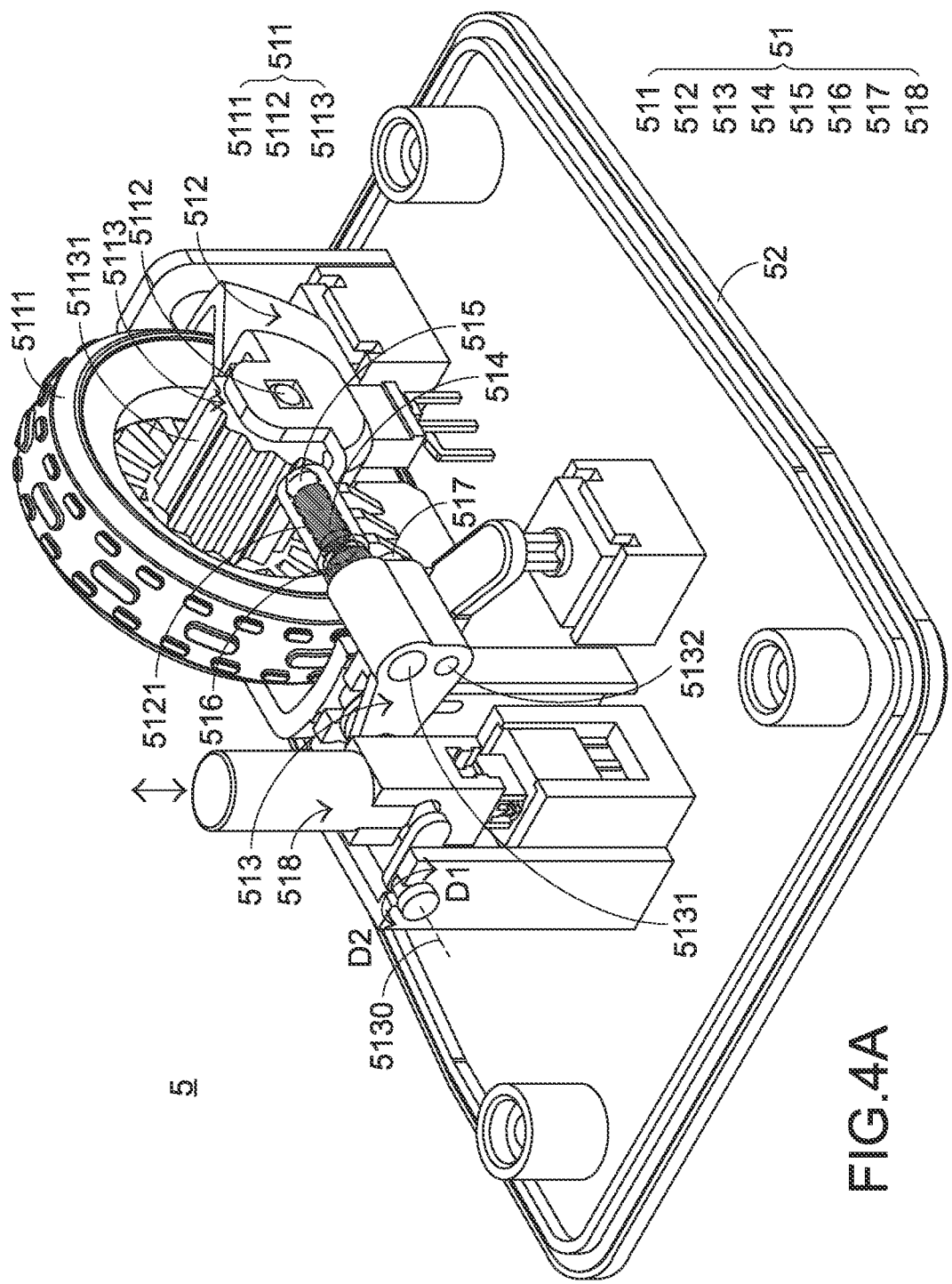
FIG. 4A schematically illustrates a portion of a roller wheel of the mouse device as shown in FIG. 3, wherein the roller wheel is in a tactile feel mode.
Figure 4B:
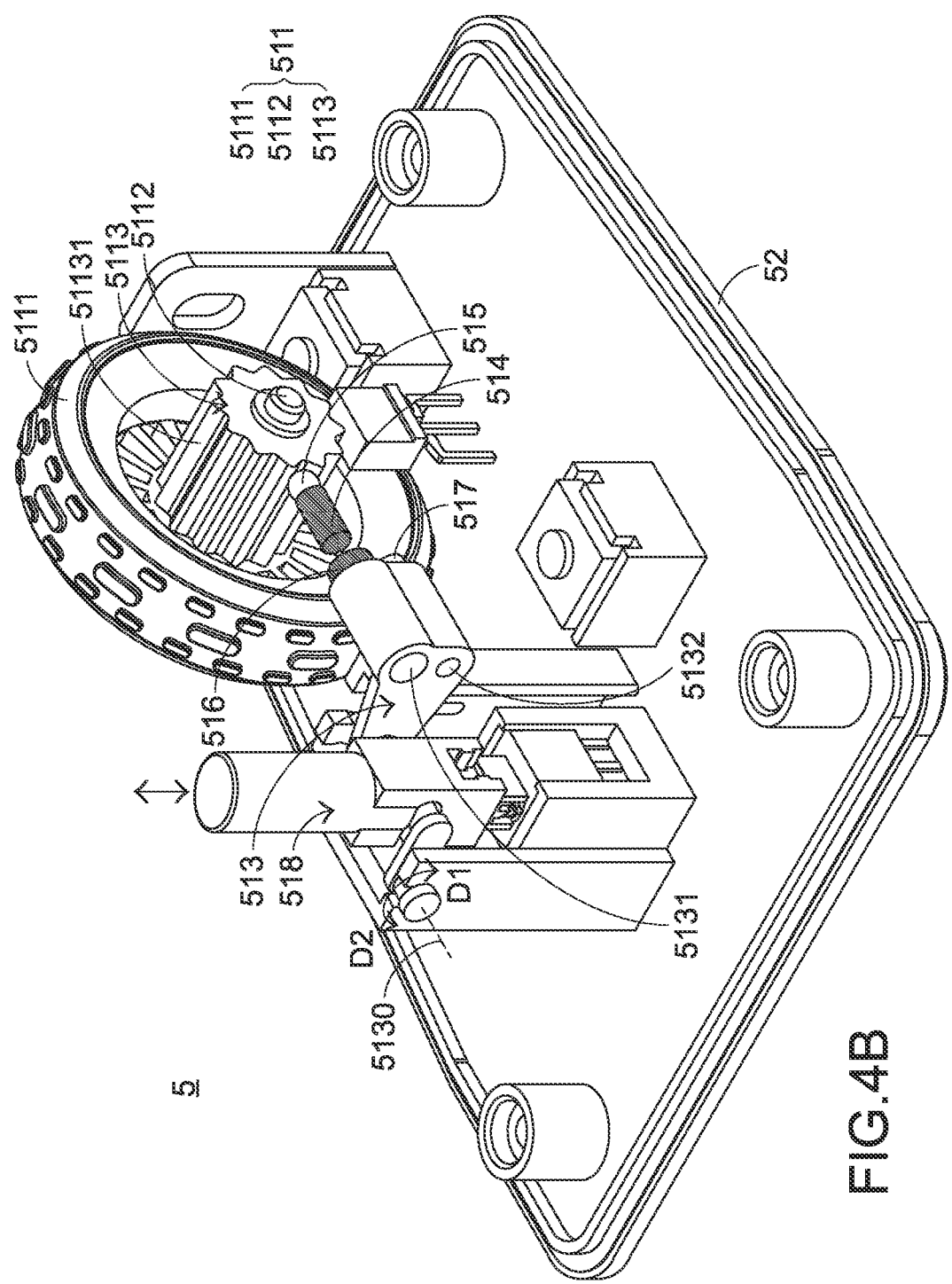
FIG. 4B schematically illustrates the roller wheel of the mouse device as shown in FIG. 4A, in which a roller bracket is not shown.

Please refer to FIGS. 4A and 4B. FIG. 4A schematically illustrates a portion of a roller wheel of the mouse device as shown in FIG. 3, wherein the roller wheel is in a tactile feel mode. FIG. 4B schematically illustrates the roller wheel of the mouse device as shown in FIG. 4A, in which a roller bracket is not shown. The mouse device 5 comprises a roller module 51 and a casing 52. For succinctness, only a portion of the casing 52 is shown in FIGS. 4A and 4B. The roller module 51 is accommodated within the casing 52. The roller module 51 comprises a roller wheel 511, a roller bracket 512, a switching assembly 513, a movable magnet 514, a rolling ball 515, a first magnet 516 and a second magnet 517.

The roller wheel 511 comprises a wheel body 5111, a rotation shaft 5112 and a ratchet 5113. A portion of the wheel body 5111 is exposed outside the casing 52 so as to be operated by the user. The rotation shaft 5112 is connected with the wheel body 5111 and supported by the roller bracket 512. When the wheel body 5111 is rotationally pushed by the user, the rotation shaft 5112 is rotated on the roller bracket 512 and synchronously rotated with the wheel body 5111. The ratchet 5113 has a toothed surface 51131. The ratchet 5113 is installed on the rotation shaft 5112 and synchronously rotated with the rotation shaft 5112.

The roller bracket 512 has a receiving channel 5121. The receiving channel 5121 is located near the ratchet 5113 of the roller wheel 511. The movable magnet 514 and the rolling ball 515 are accommodated within the receiving channel 5121. The movable magnet 514 and the rolling ball 515 within the receiving channel 5121 are magnetically attractable by each other. Moreover, the rolling ball 515 is arranged between the movable magnet 514 and the toothed surface 51131 of the ratchet 5113.

The switching assembly 513 comprises a first accommodation structure 5131 and a second accommodation structure 5132. The first magnet 516 is accommodated and fixed in the first accommodation structure 5131. The second magnet 517 is accommodated and fixed in the second accommodation structure 5132. The switching assembly 513 is used for moving one of the first magnet 516 and the second magnet 517 to be close to the movable magnet 514. When the first magnet 516 is close to the movable magnet 514, a repulsive force between the first magnet 516 and the movable magnet 514 is generated. In response to the repulsive force, the movable magnet 514 is moved toward the ratchet 5113. When the second magnet 517 is close to the movable magnet 514, an attractive force between the second magnet 517 and the movable magnet 514 is generated. In response to the attractive force, the movable magnet 514 is moved toward the second magnet 517.

In an embodiment, the first accommodation structure 5131 and the second accommodation structure 5132 of the switching assembly 513 are rotatable about a rotation axis 5130. The roller module 51 further comprises an operation part 518. A first end of the operation part 518 is connected with the switching assembly 513. At least a portion of the second end of the operation part 518 is exposed outside the casing 52 so as to be operated by the user. As the operation part 518 is operated by the user, the switching assembly 513 is correspondingly moved. Consequently, one of the first magnet 516 and the second magnet 517 is moved to be close to the movable magnet 514. As the operation part 518 is pressed down, the first accommodation structure 5131 and the second accommodation structure 5132 are rotated in a first direction D1 and the first magnet 516 is close to the movable magnet 514. As the operation part 518 is pulled up, the first accommodation structure 5131 and the second accommodation structure 5132 are rotated in a second direction D2 and the second magnet 517 is close to the movable magnet 514.

The process of switching the operation mode of the roller wheel 511 of the mouse device 5 from the tactile feel mode to the smooth scrolling mode and the process of switching the operation mode of the roller wheel 511 of the mouse device 5 from the smooth scrolling mode to the tactile feel mode will be described as follows.

For adjusting the roller wheel 511 to be in the tactile feel mode, the user may press down the operation part 518. As the operation part 518 is pressed down, the first accommodation structure 5131 and the second accommodation structure 5132 are rotated in the first direction D1 and the first magnet 516 is close to the movable magnet 514. Since the first magnet 516 is close to the movable magnet 514, a repulsive force between the first magnet 516 and the movable magnet 514 is generated. In response to the repulsive force, the movable magnet 514 and the rolling ball 515 attracted by the movable magnet 514 are moved toward the ratchet 5113. Consequently, the rolling ball 515 is contacted with the toothed surface 51131 of the ratchet 5113. When the wheel body 5111 of the roller wheel 511 is rotationally pushed by the user, the rolling ball 515 and the toothed surface 51131 of the ratchet 5113 interfere with each other. Consequently, the rotation of the wheel body 5111 results in the tactile feel.

Figure 5A:
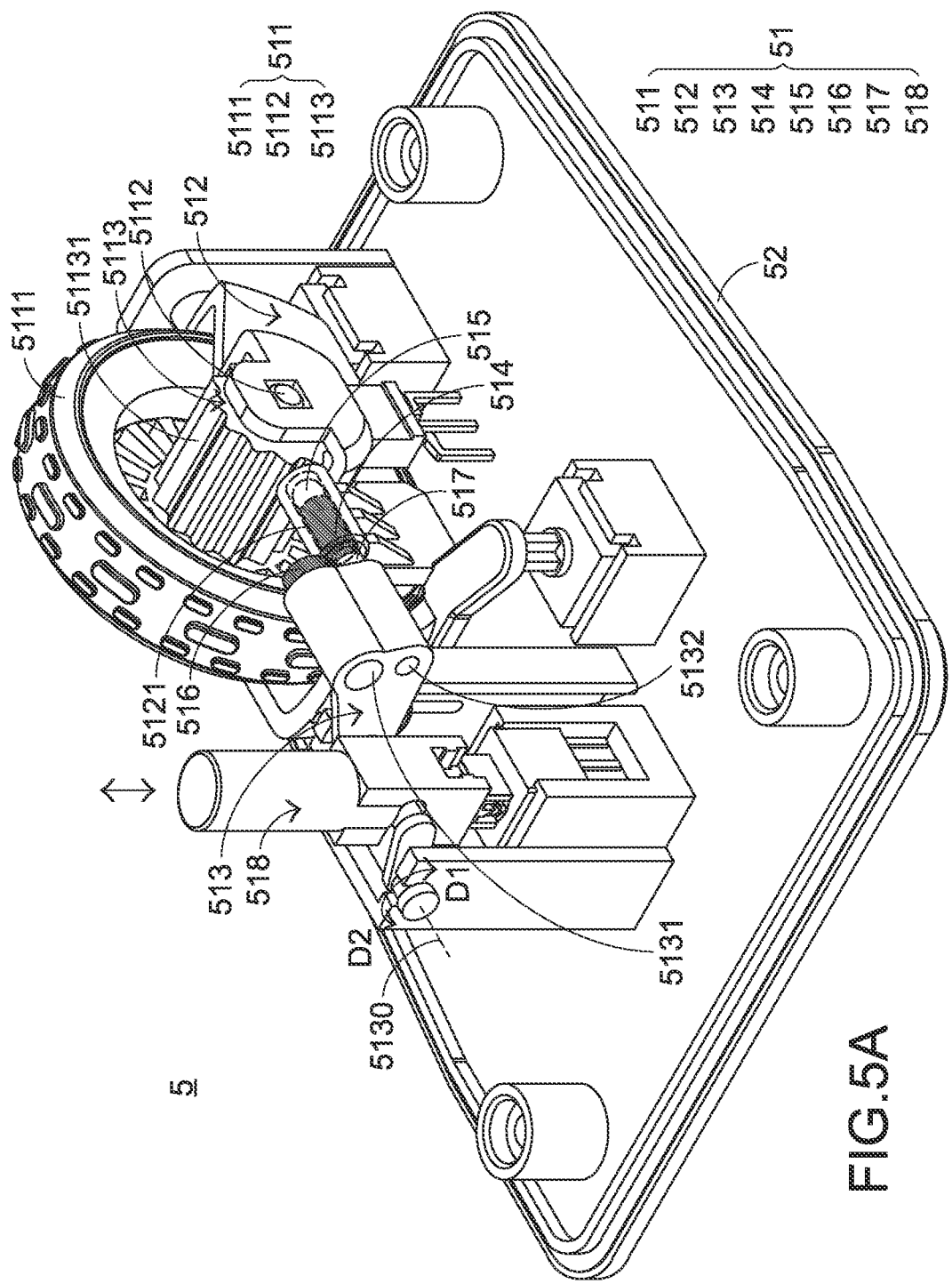
FIG. 5A schematically illustrates a portion of a roller wheel of the mouse device as shown in FIG. 3, wherein the roller wheel is in a smooth scrolling mode.
Figure 5B:
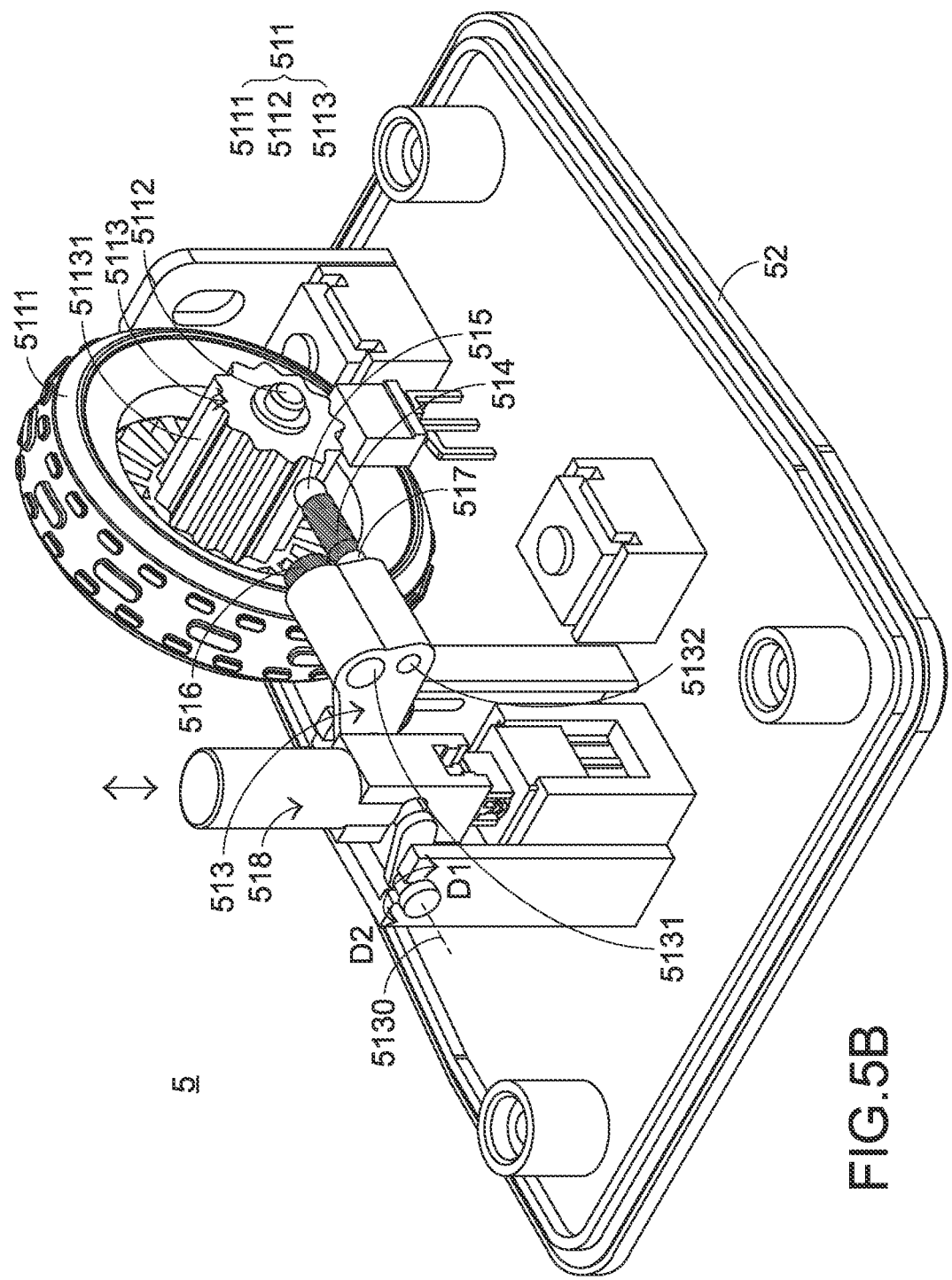
FIG. 5B schematically illustrates the roller wheel of the mouse device as shown in FIG. 5A, in which the roller bracket is not shown.

Please refer to FIGS. 5A and 5B. FIG. 5A schematically illustrates a portion of a roller wheel of the mouse device as shown in FIG. 3, wherein the roller wheel is in a smooth scrolling mode. FIG. 5B schematically illustrates the roller wheel of the mouse device as shown in FIG. 5A, in which the roller bracket is not shown. For succinctness, only a portion of the casing 52 is shown in FIGS. 5A and 5B. For adjusting the roller wheel 511 to be in the smooth scrolling mode, the user may pull up the operation part 518. As the operation part 518 is pulled up, the first accommodation structure 5131 and the second accommodation structure 5132 are rotated in the second direction D2 and the second magnet 517 is close to the movable magnet 514. Since the second magnet 517 is close to the movable magnet 514, an attractive force between the second magnet 517 and the movable magnet 514 is generated. In response to the attractive force, the movable magnet 514 and the rolling ball 515 attracted by the movable magnet 514 are moved toward the second magnet 517. Consequently, the rolling ball 515 is separated from the toothed surface 51131 of the ratchet 5113. When the wheel body 5111 of the roller wheel 511 is rotationally pushed by the user, the rolling ball 515 and the toothed surface 51131 of the ratchet 5113 do not interfere with each other. Consequently, the rotation of the wheel body 5111 results in the smooth scrolling feel.

Figure 6:
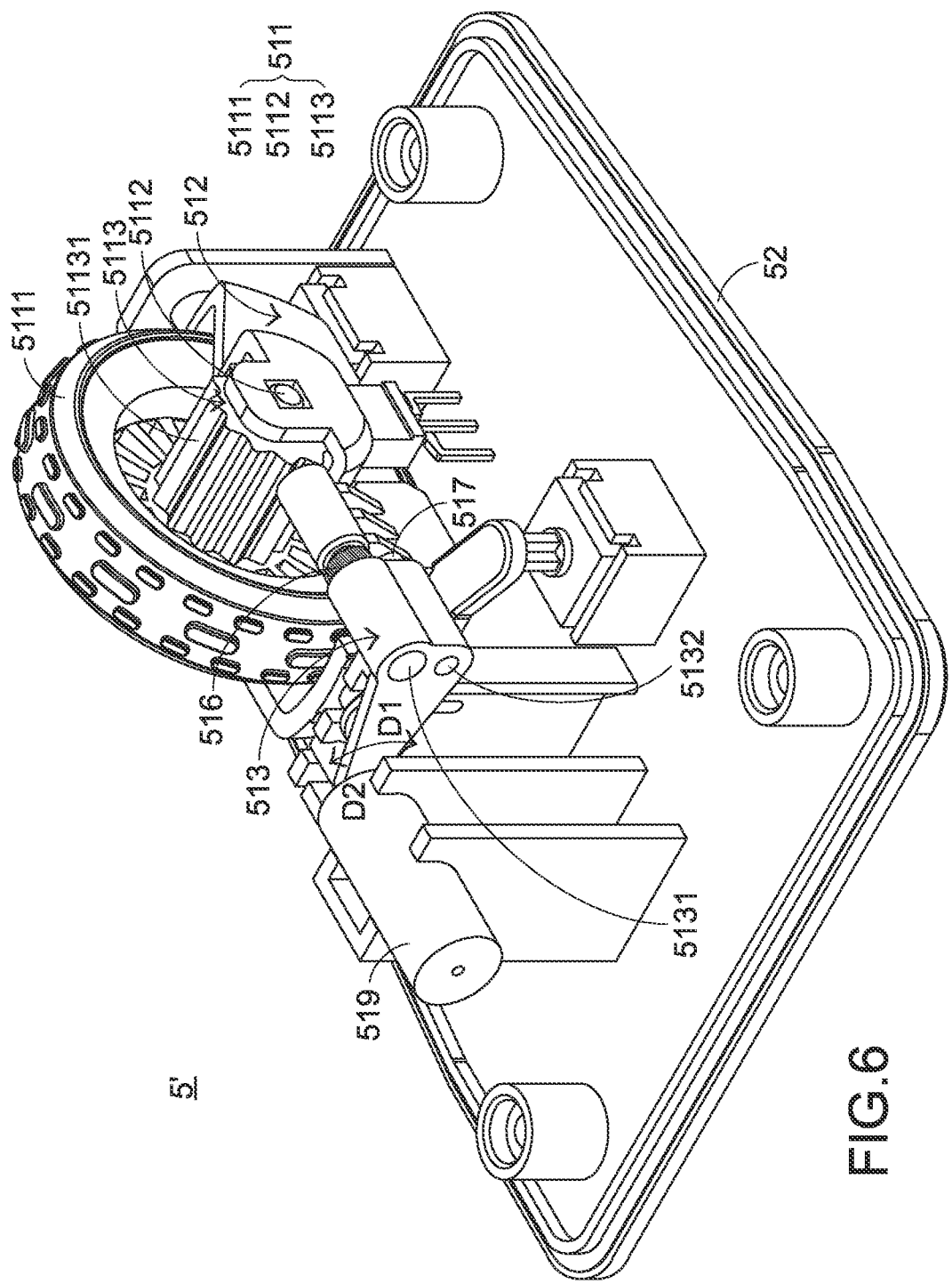
FIG. 6 schematically illustrates a portion of a roller wheel of a mouse device according to a second embodiment of the present invention, in which the roller wheel is in a tactile feel mode.
Figure 7:
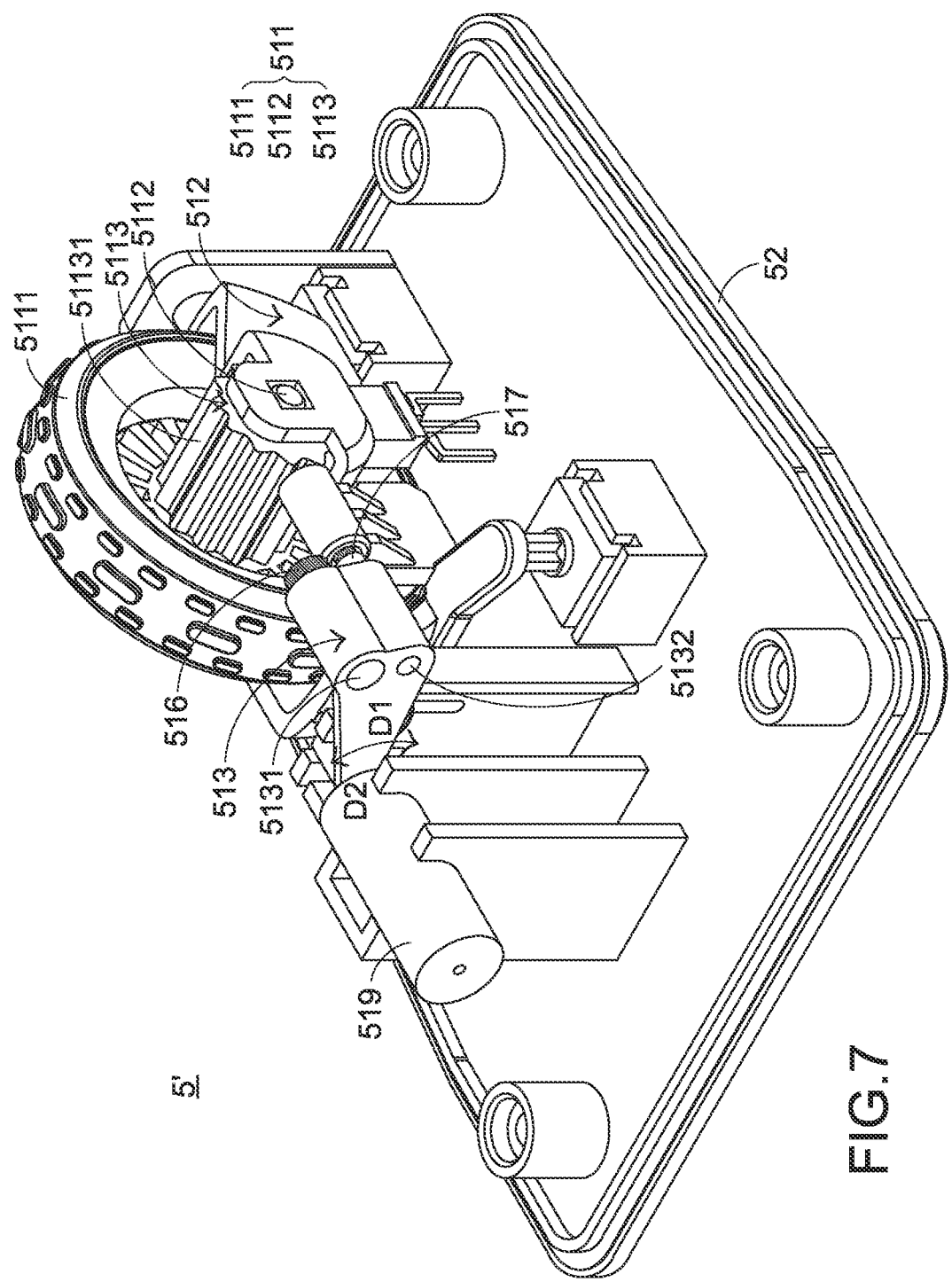
FIG. 7 schematically illustrates a portion of the roller wheel of the mouse device as shown in FIG. 6, in which the roller wheel is in a smooth scrolling mode.

Please refer to FIGS. 6 and 7. FIG. 6 schematically illustrates a portion of a roller wheel of a mouse device according to a second embodiment of the present invention, in which the roller wheel is in a tactile feel mode. FIG. 7 schematically illustrates a portion of the roller wheel of the mouse device as shown in FIG. 6, in which the roller wheel is in a smooth scrolling mode. For succinctness, only a portion of the casing 52 of the mouse device 5' are shown in FIGS. 6 and 7. The structures and functions of the components of the mouse device 5' which are identical to those of the first embodiment are not redundantly described herein. In comparison with the first embodiment, the roller module 51 of the mouse device 5' of this embodiment further comprises a motor 519 to replace the operation part 518. The motor 519 is connected with the switching assembly 513 to provide motive power to the operation part 518. Consequently, one of the first magnet 516 and the second magnet 517 is moved to be close to the movable magnet 514.

For adjusting the roller wheel 511 to be in the tactile feel mode, the motor 519 is enabled to drive the synchronous rotation of the first accommodation structure 5131 and the second accommodation structure 5132 in the first direction D1 and the first magnet 516 is close to the movable magnet 514 (see FIG. 6). Since the first magnet 516 is close to the movable magnet 514, a repulsive force between the first magnet 516 and the movable magnet 514 is generated. In response to the repulsive force, the movable magnet 514 and the rolling ball 515 attracted by the movable magnet 514 are moved toward the ratchet 5113. Consequently, the rolling ball 515 is contacted with the toothed surface 51131 of the ratchet 5113. When the wheel body 5111 of the roller wheel 511 is rotationally pushed by the user, the rolling ball 515 and the toothed surface 51131 of the ratchet 5113 interfere with each other. Consequently, the rotation of the wheel body 5111 results in the tactile feel.

For adjusting the roller wheel 511 to be in the smooth scrolling mode, the motor 519 is enabled to drive the synchronous rotation of the first accommodation structure 5131 and the second accommodation structure 5132 in the second direction D2 and the second magnet 517 is close to the movable magnet 514 (see FIG. 7). Since the second magnet 517 is close to the movable magnet 514, an attractive force between the second magnet 517 and the movable magnet 514 is generated. In response to the attractive force, the movable magnet 514 and the rolling ball 515 attracted by the movable magnet 514 are moved toward the second magnet 517. Consequently, the rolling ball 515 is separated from the toothed surface 51131 of the ratchet 5113. When the wheel body 5111 of the roller wheel 511 is rotationally pushed by the user, the rolling ball 515 and the toothed surface 51131 of the ratchet 5113 do not interfere with each other. Consequently, the rotation of the wheel body 5111 results in the smooth scrolling feel.

Figure 8:
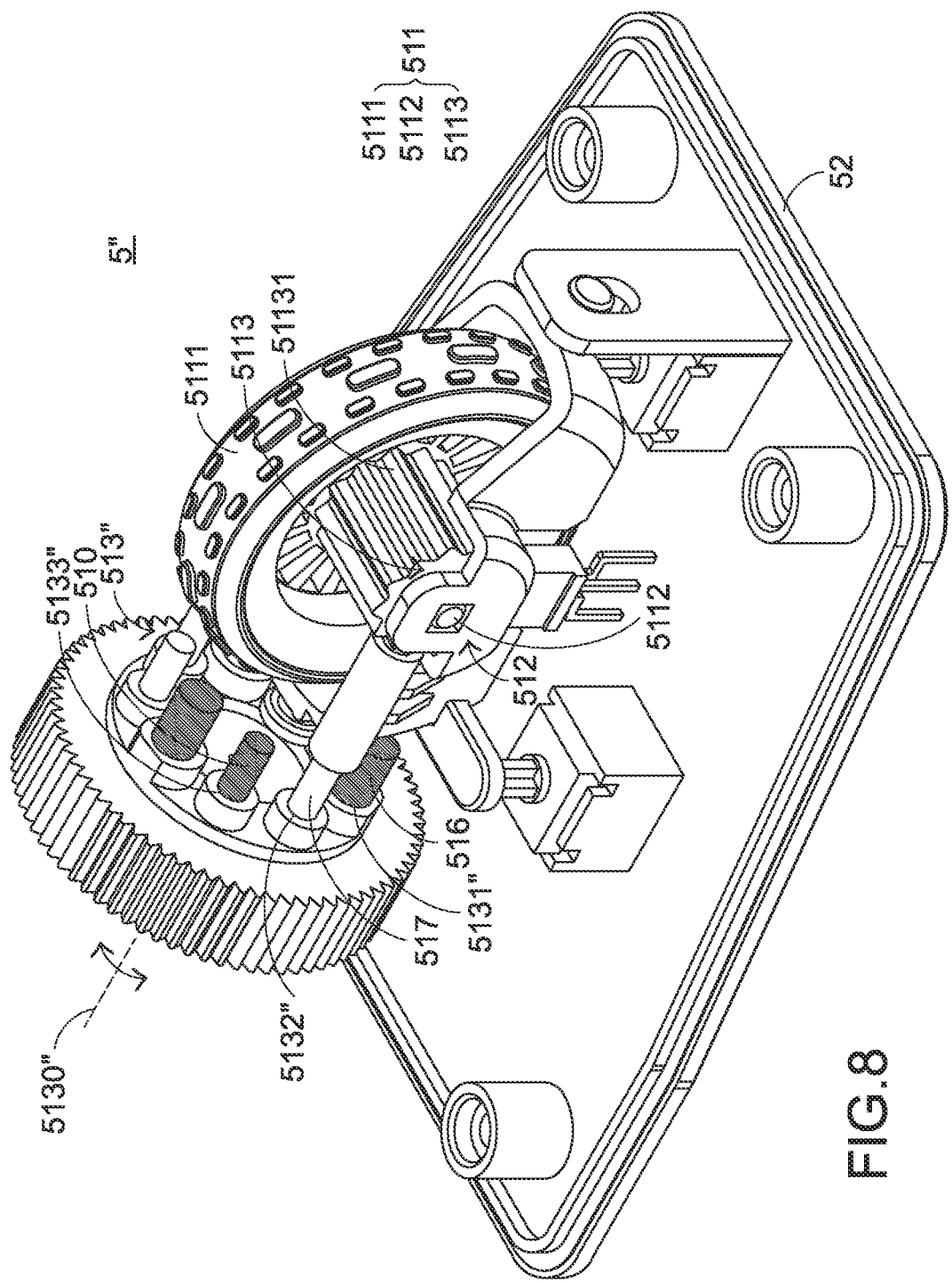
FIG. 8 schematically illustrates a portion of a roller wheel of a mouse device according to a third embodiment of the present invention.

FIG. 8 schematically illustrates a portion of a roller wheel of a mouse device according to a third embodiment of the present invention. For succinctness, only a portion of the casing 52 of the mouse device 5" are shown in FIG. 8. The structures and functions of the components of the mouse device 5" which are identical to those of the first embodiment are not redundantly described herein. In comparison with the first embodiment, the roller module 51 of the mouse device 5" of this embodiment further comprises a third magnet 510. Moreover, the switching assembly 513" has a wheel structure. At least a portion of the switching assembly 513" is exposed outside the casing 52 so as to be rotated by the user. The switching assembly 513" comprises a first accommodation structure 5131", a second accommodation structure 5132" and a third accommodation structure 5133". The first accommodation structure 5131", the second accommodation structure 5132" and the third accommodation structure 5133" are rotatable about a rotation axis 5130". The first magnet 516 is accommodated and fixed in the first accommodation structure 5131". The second magnet 517 is accommodated and fixed in the second accommodation structure 5132". The third magnet 510 is accommodated and fixed in the third accommodation structure 5133". As mentioned above, when the first magnet 516 is close to the movable magnet 514, a repulsive force between the first magnet 516 and the movable magnet 514 is generated. Similarly, when the third magnet 510 is close to the movable magnet 514, a repulsive force between the third magnet 510 and the movable magnet 514 is generated. The repulsive force between the third magnet 510 and the movable magnet 514 and the repulsive force between the first magnet 516 and the movable magnet 514 are different.

For adjusting the roller wheel 511 to be in a first tactile feel mode, the switching assembly 513" is rotated to drive the synchronous rotation of the first accommodation structure 5131", the second accommodation structure 5132" and the third accommodation structure 5133" and the first magnet 516 is close to the movable magnet 514. Since the first magnet 516 is close to the movable magnet 514, a repulsive force between the first magnet 516 and the movable magnet 514 is generated. In response to the repulsive force, the movable magnet 514 and the rolling ball 515 attracted by the movable magnet 514 are moved toward the ratchet 5113. Consequently, the rolling ball 515 is contacted with the toothed surface 51131 of the ratchet 5113. When the wheel body 5111 of the roller wheel 511 is rotationally pushed by the user, the rolling ball 515 and the toothed surface 51131 of the ratchet 5113 interfere with each other. Consequently, the rotation of the wheel body 5111 results in the tactile feel.

For adjusting the roller wheel 511 to be in a second tactile feel mode, the switching assembly 513" is rotated to drive the synchronous rotation of the first accommodation structure 5131", the second accommodation structure 5132" and the third accommodation structure 5133" and the third magnet 510 is close to the movable magnet 514. Since the third magnet 510 is close to the movable magnet 514, a repulsive force between the third magnet 510 and the movable magnet 514 is generated. In response to the repulsive force, the movable magnet 514 and the rolling ball 515 attracted by the movable magnet 514 are moved toward the ratchet 5113. Consequently, the rolling ball 515 is contacted with the toothed surface 51131 of the ratchet 5113. When the wheel body 5111 of the roller wheel 511 is rotationally pushed by the user, the rolling ball 515 and the toothed surface 51131 of the ratchet 5113 interfere with each other. Consequently, the rotation of the wheel body 5111 results in the tactile feel.

As mentioned above, the repulsive force between the third magnet 510 and the movable magnet 514 and the repulsive force between the first magnet 516 and the movable magnet 514 are different. Consequently, the tactile feel to the user in the second tactile feel mode and the tactile feel to the user in the first tactile feel mode are different For adjusting the roller wheel 511 to be in the smooth scrolling mode, the switching assembly 513" is rotated to drive the synchronous rotation of the first accommodation structure 5131", the second accommodation structure 5132" and the third accommodation structure 5133" and the second magnet 517 is close to the movable magnet 514. Since the second magnet 517 is close to the movable magnet 514, an attractive force between the second magnet 517 and the movable magnet 514 is generated. In response to the attractive force, the movable magnet 514 and the rolling ball 515 attracted by the movable magnet 514 are moved toward the second magnet 517. Consequently, the rolling ball 515 is separated from the toothed surface 51131 of the ratchet 5113. When the wheel body 5111 of the roller wheel 511 is rotationally pushed by the user, the rolling ball 515 and the toothed surface 51131 of the ratchet 5113 do not interfere with each other. Consequently, the rotation of the wheel body 5111 results in the smooth scrolling feel.

From the above descriptions, the structural relationships of the mouse device and the roller module are simplified. According to the principle "Like poles repel of magnets while unlike poles of magnets attract", the roller wheel can be operated in the smooth scrolling mode or the tactile feel mode. While the operation mode of the roller wheel is switched, the number of the linked components is reduced. Consequently, the mouse device of the present invention can be fabricated more easily. Moreover, even if the mouse device is frequently used, the possibility of causing damage will be largely reduced. Since the wheel module of the mouse device can provide different tactile feel modes, the operations of the mouse device are more diverse.

In the above embodiments, the rotation of the wheel body 5111 results in the tactile feel because of the interference between the rolling ball 515 and the toothed surface 51131 of the ratchet 5113. It is noted that numerous modifications and alterations may be made while retaining the teachings of the invention. For example, in another embodiment, the roller module 51 is not equipped with the rolling ball 515. The end of the movable magnet 514 located near the ratchet 5113 has an arc-shaped structure. Due to the interference between the arc-shaped structure of the rolling ball 515 and the toothed surface 51131 of the ratchet 5113, the rotation of the wheel body 5111 results in the tactile feel.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A roller module for a mouse device, the roller module comprising:
   a roller wheel comprising a wheel body, a rotation shaft and a ratchet, wherein the rotation shaft is connected with the wheel body and synchronously rotated with the wheel body, the ratchet is installed on the rotation shaft, and the ratchet has a toothed surface;
   a roller bracket, and the rotation shaft of the roller wheel is supported by the roller bracket, so that the wheel body is rotatable relative to the roller bracket through the rotation shaft;
   a movable magnet;
   a receiving channel, wherein the movable magnet is accommodated within the receiving channel and movable within the receiving channel;
   a first magnet, wherein when the first magnet is close to the movable magnet, a first repulsive force between the first magnet and the movable magnet is generated and the movable magnet is moved toward the toothed surface of the ratchet in response to the first repulsive force, so that the roller wheel is in a tactile feel mode; and
   a second magnet, wherein when the second magnet is close to the movable magnet, an attractive force between the second magnet and the movable magnet is generated and the movable magnet is moved toward the second magnet in response to the attractive force, so that the roller wheel is in a smooth scrolling mode.

2. The roller module according to claim 1, wherein the roller module further comprises a rolling ball, and the rolling ball is magnetically attracted by the movable magnet and arranged between the movable magnet and the toothed surface of the ratchet, wherein as the movable magnet is moved toward the toothed surface and the rolling ball is contacted with the toothed surface, the roller wheel is in the tactile feel mode, wherein as the movable magnet is moved toward the second magnet and the rolling ball is separated from the toothed surface, the roller wheel is in the smooth scrolling mode.

3. The roller module according to claim 1, wherein the receiving channel is installed on the roller bracket.

4. The roller module according to claim 1, wherein the roller module further comprises a switching assembly, and the first magnet and the second magnet are installed on the switching assembly, wherein one of the first magnet and the second magnet is adjusted to be close to the movable magnet through an operation of the switching assembly.

5. The roller module according to claim 4, wherein the switching assembly comprises a first accommodation structure and a second accommodation structure, wherein the first accommodation structure and the second accommodation structure are rotatable about a rotation axis, the first magnet is accommodated within the first accommodation structure, and the second magnet is accommodated within the second accommodation structure.

6. The roller module according to claim 4, wherein the roller module further comprises an operation part, wherein a first end of the operation part is connected with the switching assembly, and a second end of the operation part is operable by a user, wherein as the operation part is operated by the user, the switching assembly is correspondingly moved, so that the one of the first magnet and the second magnet is moved to be close to the movable magnet.

7. The roller module according to claim 4, wherein the roller module further comprises a motor, wherein the motor provides motive power to the switching assembly, so that the one of the first magnet and the second magnet is moved to be close to the movable magnet.

8. The roller module according to claim 1, wherein the roller module further comprises a third magnet, wherein when the third magnet is close to the movable magnet, a second attractive force between the third magnet and the movable magnet is generated and the movable magnet is moved toward the toothed surface of the ratchet in response to the second repulsive force, so that the roller wheel is in another tactile feel mode, wherein a magnitude of the first attractive force and a magnitude of the second attractive force are different.

9. A mouse device, comprising:
  a roller wheel comprising a wheel body, a rotation shaft and a ratchet, wherein the rotation shaft is connected with the wheel body and synchronously rotated with the wheel body, the ratchet is installed on the rotation shaft, and the ratchet has a toothed surface;
  a movable magnet;
  a first magnet, wherein when the first magnet is close to the movable magnet, a first repulsive force between the first magnet and the movable magnet is generated and the movable magnet is moved toward the toothed surface of the ratchet in response to the first repulsive force, so that the roller wheel is in a tactile feel mode;
  a second magnet, wherein when the second magnet is close to the movable magnet, an attractive force between the second magnet and the movable magnet is generated and the movable magnet is moved toward the second magnet in response to the attractive force, so that the roller wheel is in a smooth scrolling mode;
  a switching assembly, and the first magnet and the second magnet are installed on the switching assembly, wherein one of the first magnet and the second magnet is adjusted to be close to the movable magnet through an operation of the switching assembly, wherein the switching assembly comprises a first accommodation structure and a second accommodation structure, wherein the first accommodation structure and the second accommodation structure are rotatable about a rotation axis, the first magnet is accommodated within the first accommodation structure, and the second magnet is accommodated within the second accommodation structure; and
  a casing, wherein the roller wheel, the movable magnet, the first magnet and the second magnet are accommodated within the casing, and at least a portion of the wheel body is exposed outside the casing so as to be operated by a user.

10. The mouse device according to claim 9, wherein the mouse device further comprises a rolling ball, and the rolling ball is magnetically attracted by the movable magnet and arranged between the movable magnet and the toothed surface of the ratchet, wherein as the movable magnet is moved toward the toothed surface and the rolling ball is contacted with the toothed surface, the roller wheel is in the tactile feel mode, wherein as the movable magnet is moved toward the second magnet and the rolling ball is separated from the toothed surface, the roller wheel is in the smooth scrolling mode.

11. The mouse device according to claim 9, wherein the mouse device further comprises a roller bracket, and the rotation shaft of the roller wheel is supported by the roller bracket, so that the wheel body is rotatable relative to the roller bracket through the rotation shaft.

12. The mouse device according to claim 11, wherein the mouse device further comprises a receiving channel, wherein the movable magnet is accommodated within the receiving channel and movable within the receiving channel.

13. The mouse device according to claim 12, wherein the receiving channel is installed on the roller bracket.

14. The mouse device according to claim 9, wherein the mouse device further comprises an operation part, wherein a first end of the operation part is connected with the switching assembly, and a second end of the operation part is operable by the user, wherein as the operation part is operated by the user, the switching assembly is correspondingly moved, so that the one of the first magnet and the second magnet is moved to be close to the movable magnet.

15. The mouse device according to claim 9, wherein the mouse device further comprises a motor, wherein the motor provides motive power to the switching assembly, so that the one of the first magnet and the second magnet is moved to be close to the movable magnet.

16. The mouse device according to claim 9, wherein the mouse device further comprises a third magnet, wherein when the third magnet is close to the movable magnet, a second attractive force between the third magnet and the movable magnet is generated and the movable magnet is moved toward the toothed surface of the ratchet in response to the second repulsive force, so that the roller wheel is in another tactile feel mode, wherein a magnitude of the first attractive force and a magnitude of the second attractive force are different.

* * * * *